INVENTOR.
IRA D. SMITH Jr.
BY Wade Koontz and Martin J. Finnegan
ATTORNEYS

March 29, 1966 I. D. SMITH, JR 3,243,804

FOUR HORN SEQUENTIAL LOBING RADAR

Filed July 26, 1963 2 Sheets-Sheet 2

INVENTOR.
IRA D. SMITH Jr.
BY Wade Koontz
Martin J. Finnegan
ATTORNEYS

United States Patent Office
3,243,804
Patented Mar. 29, 1966

3,243,804

FOUR HORN SEQUENTIAL LOBING RADAR

Ira D. Smith, Jr., West Acton, Mass., assignor to the United States of America as represented by the Secretary of the Air Force Filed July 26, 1963, Ser. No. 297,989
4 Claims. (Cl. 343—7.4)

The invention described herein may be manufactured and used by or for the United States Government for governmental purposes without payment to me of any royalty thereon.

This invention relates to directional radio antennas, and more particularly to a method of and means for maintaining the true direction of the antenna at a desired transmitter or target.

In radar systems it is important to have an antenna system which is directional and which further has means for indicating when the antenna is pointed directly at a desired target, and it is important to cause the direction of antenna response to be shifted so as to scan a solid angle or cone of space. Thus, the position of an object anywhere in the space scanned can be completely defined in terms of its azimuthal and elevational coordinates.

Such sequential lobing radar systems as have been used in the past, e.g. conical scan employing a single nutating field have a limited lobing cycle because the lobing cycle in such systems is limited by mechanical nutation such as feed rotation. Also, some monopulse receivers have three receivers in the complete angle tracking loop, and thus have multi-receiver channel instability as a source of angular error. In addition, three channel monopulse receivers must also have three pulse compression networks; thus, proper balance of phase and insertion loss (plus proper phase and gain balance of additional amplifiers which must overcome this insertion loss) produces difficulty in maintaining optimum angle tracking sensitivity. And in conventional four-horn systems the energy generated by a transmitter is emitted by the combined horns as a single directive beam thus confusing the radar characteristics of a given target because of significant interference from the presence of other targets.

Accordingly, it is an object of this invention to provide a sequential lobing system that will have a lobing cycle which is limited only by its pulse repetition frequency.

Another object of this invention is to provide a sequential lobing system in which only one receiver is required in a complete angle tracking loop.

Still another object of this invention is to provide a sequential lobing radar system in which only one pulse compression network is required in the angle tracking loop.

A further object of this invention is to provide a sequential lobing radar system for producing nine beams from a four-horn configuration.

These and other objects of my invention may be more fully understood from a careful consideration of the following detailed description when taken together with the accompanying drawings, the figures of which illustrate typical embodiments of my invention.

Figure 1:
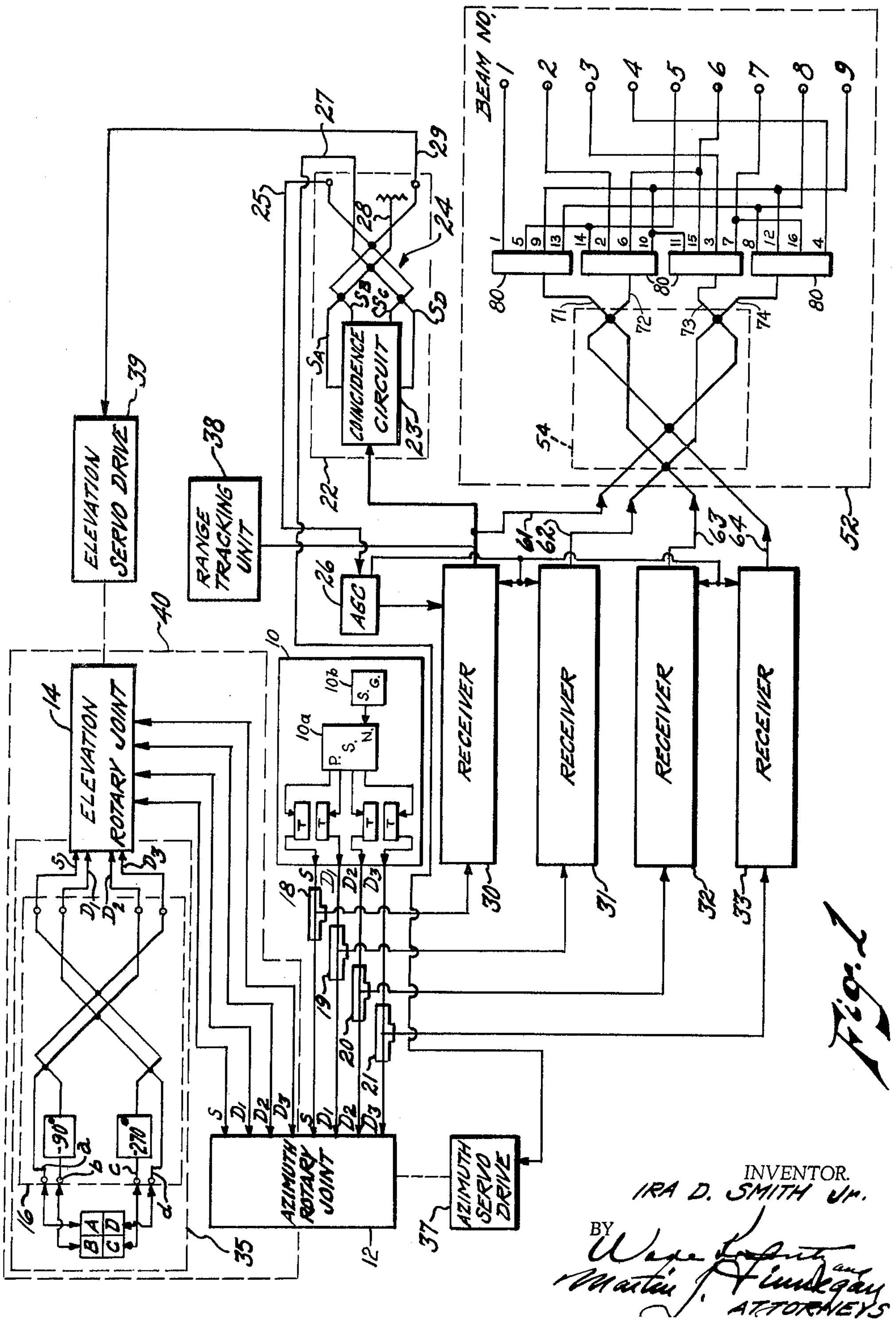
FIG. 1 illustrates in electrical schematic form an embodiment of my invention in a high range and angle resolution tracker.

My invention may be understood more simply by referring to FIG. 1 which illustrates an embodiment of my invention in an automatic tracking radar which requires high order multiple target range resolution characteristics. The transmitter sub-system 10 includes pulse encoding equipment, signal generator 10*b*, phase switching network 10*a*, and four transmitters T, for pulse compression and has four outputs of equal magnitude, S, $D_1$, $D_2$, and $D_3$. The phase relationships among these outputs are controlled by a phase switching network 10*a* which varies at the p.r.f. rate. The phase network in the instant embodiment consists of simple R.C. switching circuits controlled by the same timing generator which controls the pulses from signal generator 10*b*. A repetitious sequence of four combinations is used. The following table shows the proper phase combinations for outputs S, $D_1$, $D_2$ and $D_3$ during each sequence interval.

*Table I*

| Sequence interval | 1 | 2 | 3 | 4 |
|---|---|---|---|---|
| Transmitter output: | | | | |
| S | 0° | 0° | 0° | 0° |
| $D_1$ | 90° | 270° | 270° | 90° |
| $D_2$ | 180° | 0° | 180° | 0° |
| $D_3$ | 90° | 90° | 270° | 270° |

After the transmitter power passes through four-channel azimuth and elevation rotary joints 12 and 14, the energy is recombined in an R-F hybrid and antenna feed assembly 16 identical to that used in conventional four horn amplitude comparison monopulse trackers. A conventional assembly is described in detail in Patent No. 2,830,288 issued on April 8, 1958 by R. H. Dicke, entitled "Lobing System." Hybrid assembly 16 combines the tansmitter outputs S, $D_1$, $D_2$ and $D_3$ in such a way the Horn A transmits all of the energy during Interval (1), Horn B during Interval (2), Horn C during Interval (3) and Horn D during Interval (4). Thus, a form of sequential lobing is achieved.

During each sequence interval, energy from the illuminated target or targets is received in all four horns. If a target is on axis, each horn receives the same amount of reflected energy from that target during each interval even though only one horn transmitted the illumination. The following table shows the symbols used for the magnitudes of the signals received by each horn during each sequence interval.

*Table II*

| Interval | Transmit horn | Receive horn | Received signal |
|---|---|---|---|
| 1 | A | A | $A_A$. |
| | | B | $B_A$. |
| | | C | $C_A$. |
| | | D | $D_A$. |
| 2 | B | A | $A_B$. |
| | | B | $B_B$. |
| | | C | $C_B$. |
| | | D | $D_B$. |
| 3 | C | A | $A_C$. |
| | | B | $B_C$. |
| | | C | $C_C$. |
| | | D | $D_C$. |
| 4 | D | A | $A_D$. |
| | | B | $B_D$. |
| | | C | $C_D$. |
| | | D | $D_D$. |

The received signals are combined in the eight terminal balanced R-F hybrid assembly 16 to produce one sum signal and three difference signals. The following table shows the four inputs and four outputs of the hybrid assembly.

*Table III*

| Interval | Input terminal | Input signal | Output term. | Output signal |
|---|---|---|---|---|
| 1 | a | $A_A$ | S | $S_A=A_A+B_A+C_A+D_A$. |
| | b | $B_A$ | $D_1$ | $D_{XA}=A_A-B_A-C_A+D_A$. |
| | c | $C_A$ | $D_2$ | $D_{ZA}=A_A-B_A+C_A-D_A$. |
| | d | $D_A$ | $D_3$ | $D_{YA}=A_A+B_A-C_A-D_A$. |
| 2 | a | $A_B$ | S | $S_B=A_B+B_B+C_B+D_B$. |
| | b | $B_B$ | $D_1$ | $D_{XB}=A_B-B_B-C_B+D_B$. |
| | c | $C_B$ | $D_2$ | $D_{ZB}=A_B-B_B+C_B-D_B$. |
| | d | $D_B$ | $D_3$ | $D_{YB}=A_B+B_B-C_B-D_B$. |
| 3 | a | $A_C$ | S | $S_C=A_C+B_C+C_C+D_C$. |
| | b | $B_C$ | $D_1$ | $D_{XC}=A_C-B_C-C_C+D_C$. |
| | c | $C_C$ | $D_2$ | $D_{ZC}=A_C-B_C+C_C-D_C$. |
| | d | $D_C$ | $D_3$ | $D_{YC}=A_C+B_C-C_C-D_C$. |
| 4 | a | $A_D$ | S | $S=A_D+B_D+C_D+D_D$. |
| | b | $B_D$ | $D_1$ | $D_{XD}=A_D-B_D-C_D+D_D$. |
| | c | $C_D$ | $D_2$ | $D_{ZD}=A_D-B_D+C_D-D_D$. |
| | d | $D_D$ | $D_3$ | $D_{YD}=A_D+B_D-C_D-D_D$. |

The sum signals, $S_A$, $S_B$, $S_C$ and $S_D$, which appear at terminal S are the only signals used for tracking. These signals pass through the duplexer 18 on into receiver channel 30 where pulse compression is performed to achieve high range resolution. It is to be noted that while the system is operating as a high range resolution tracker, high power duplexers 19, 20 and 21, and their associated receivers 31, 32 and 33, and angle resolution matrix 52 are not operative. The receiver outputs which are still denoted as $S_A$, $S_B$, $S_C$ and $S_D$ are inserted into a tracking matrix 22. In tracking matrix 22, a device 23 operates on the four sum signals in such a manner that they are in coincidence with one another at the inputs to an eight terminal balanced video hybrid assembly 24. Device 23 operates by means of time gates, controlled by the same timing generator which controls the transmitter p.r.f. and phase switching sequence. These time gates separate the four receiver outputs, and then delays $S_A$ three pulse repetition intervals, delays $S_B$ two pulse repetition intervals and delays $S_C$ one pulse repetition interval such that they are coincident with $S_D$. Hybrid assembly 24 is a video analogy to the receive mode of hybrid assembly 16 that is employed in the R-F portion of the receivers.

The following table shows the four inputs and four outputs of hybrid assembly 22 which represent the full sequence.

*Table IV*

| Inputs | Outputs | |
|---|---|---|
| $S_A=A_A+B_A+C_A+D_A$ | $S=S_A+S_B+S_C+S_D$ | AGC Signal 25. |
| $S_B=A_B+B_B+C_B+D_B$ | $D_X=S_A-S_B-S_C+S_D$ | Az. Error 27. |
| $S_C=A_C+B_C+C_C+D_C$ | $D_Y=S_A+S_B-S_C-S_D$ | El. Error 29. |
| $S_D=A_D+B_D+C_D+D_D$ | $D_Z=S_A-S_B+S_C-S_D$ | Dummy 28. |

AGC signal 25 is amplified and fed into an automatic gain controlled amplifier 26 in receiver 30. This operation normalizes the azimuth and elevation error patterns with respect to target variations in size and range. The azimuth and elevation errors 27 and 29 are inserted into their respective servo devices 37 and 39 which maintain the antenna axis on target through antenna pedestal elevation assembly 35. The outputs of receiver 30 are also fed to range tracking unit 38, a conventional circuit which, using signals from timing generator which controls firing of transmitter pulses, measures target distance from the radar.

In summarizing, the features of this high range resolution sequential lobing radar tracker are:

(1) The antenna assembly with its associated feed system and R-F hybrid assembly is identical to that used in conventional four-horn amplitude comparison monopulse trackers.

(2) Its range performance as a function of integrated *S/N* should be approximately that of monopulse.

(3) Target amplitude scintillation which normally affects tracking accuracy of conventional conical scan or sequential lobing radars can be much less serious under certain applications since the nutation rate or lobing cycle is limited only by its pulse repetition frequency and not by mechanical nutation such as feed rotation.

(4) Only one receiver exists in the complete angle tracking loop. This eliminates many phase shift and gain balancing requirements for angle error pattern sensitivity that are prevalent in the three channel monopulse receivers. Most of the balancing problems are confined to passive components rather than active components.

(5) Only one pulse compression network is required since only one receiver is required. This eliminates any contributions to angle error pattern degradation that is derived from higher order pulse compression systems. In conventional monopulse, three such networks are required and proper balance of phase and insertion loss (plus proper phase and gain balance of additional amplifiers which must overcome this insertion loss) produces difficulty in maintaining optimum angle tracking sensitivity.

(6) The antenna gain and its associated feed system of this sequential lobing radar is higher than that of conventional sequential lobing radar (conical scan) which employs a single nutating feed.

Again referring to FIG. 1, when it is desired to operate the system as an automatic tracking radar which derives nine beams from a four horn antenna system for the purpose of improving multiple target angle resolution, the three difference signals that are received are utilized as well as the received sum signal. This is the chief difference between this radar and the operation of the high range resolution tracker just described. Four duplexers 18, 19, 20 and 21, and four receivers 30, 31, 32 and 33, and angle resolution matrix 52 are used in this embodiment. But, as before, only one receiver 30 is connected to the closed angle tracking loop matrix 22. This radar may or may not use pulse compression techniques depending upon its application.

From Table III, the receiver outputs 61, 62, 63 and 64 for each sequence interval can readily be obtained.

*Table V*

| Interval | Receiver | Output |
|---|---|---|
| 1 | No. 30 | $S_A$ |
| | No. 31 | $D_{XA}$ |
| | No. 32 | $D_{ZA}$ |
| | No. 33 | $D_{YA}$ |
| 2 | No. 30 | $S_B$ |
| | No. 31 | $D_{XB}$ |
| | No. 32 | $D_{ZB}$ |
| | No. 33 | $D_{YB}$ |
| 3 | No. 30 | $S_C$ |
| | No. 31 | $D_{XC}$ |
| | No. 32 | $D_{ZC}$ |
| | No. 33 | $D_{YC}$ |
| 4 | No. 30 | $S_D$ |
| | No. 31 | $D_{XD}$ |
| | No. 32 | $D_{ZD}$ |
| | No. 33 | $D_{YD}$ |

These receiver outputs for each sequence interval are combined in the eight terminal balanced video hybrid circuit 54 that is part of angle resolution matrix 52. Hybrid assembly 54 is a video analogy to the transmit mode of hybrid assembly 16 that is employed in the R-F section of the receiver.

The signals at the four output terminals 71, 72, 73 and 74 of the hybrid circuit 54 for each sequence interval are shown in the Table VI.

*Table VI*

| Interval | Output terminal | Output signal |
|---|---|---|
| 1 | 71 | $A_A$ |
| | 72 | $B_A$ |
| | 73 | $C_A$ |
| | 74 | $D_A$ |
| 2 | 71 | $A_B$ |
| | 72 | $B_B$ |
| | 73 | $C_B$ |
| | 74 | $D_B$ |
| 3 | 71 | $A_C$ |
| | 72 | $B_C$ |
| | 73 | $C_C$ |
| | 74 | $D_C$ |
| 4 | 71 | $A_D$ |
| | 72 | $B_D$ |
| | 73 | $C_D$ |
| | 74 | $D_D$ |

Figures 2, 3:
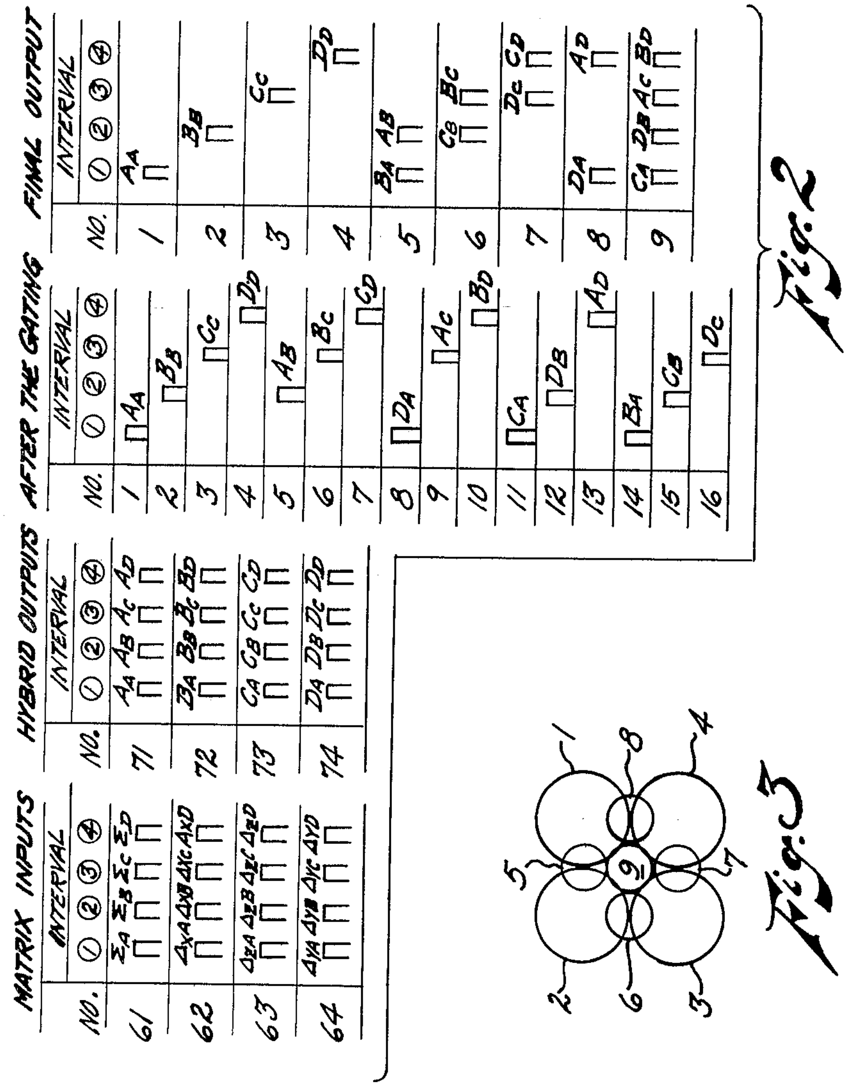
FIG. 2 is a timing chart for the high resolution tracker.
FIG. 3 illustrates beam cross-sections relative to one another produced by one embodiment of my invention.

Following the hybrid circuit operation, the signals are separated by time gates 80 according to sequence intervals, as shown in the timing chart in FIG. 2. At this point, nine antenna beams are represented using all of the sixteen transmit-receive combinations of the four feed horns. With the help of Table II, these combinations are:

*Table VII*

| Combination No. | Receive horn | Transmit horn | Received sig. |
|---|---|---|---|
| 1 | A | A | $A_A$. |
| 2 | B | B | $B_B$. |
| 3 | C | C | $C_C$. |
| 4 | D | D | $D_D$. |
| 5 | A | B | $A_B$. |
| 6 | B | C | $B_C$. |
| 7 | C | D | $C_D$. |
| 8 | D | A | $D_A$. |
| 9 | A | C | $A_C$. |
| 10 | B | D | $B_D$. |
| 11 | C | A | $C_A$. |
| 12 | D | B | $D_B$. |
| 13 | A | D | $A_D$. |
| 14 | B | A | $B_A$. |
| 15 | C | B | $C_B$. |
| 16 | D | C | $D_C$. |

Some of these combinations produce beams which are coincident with one another. (Note: Those beams which have different transmit and receive horns are referred to as sub-beams. Those beams whose receive horn is the transmit horn are referred to as main beams.) The combinations are associated with the following beams:

*Table VIII*

| Beam No. | Combination No. | |
|---|---|---|
| 1 | 1 | Main beam. |
| 2 | 2 | Do. |
| 3 | 3 | Do. |
| 4 | 4 | Do. |
| 5 | 5, 14 | Sub beam. |
| 6 | 6, 15 | Do. |
| 7 | 7, 16 | Do. |
| 8 | 8, 13 | Do. |
| 9 | 9, 10, 11, 12 | Do. |

In FIG. 3 there is a sketch of the beam cross-sections relative to one another. After time gating with respect to sequence intervals, signals from combinations that represent the same beam are combined with one another as shown in FIG. 2. The signals are combined by tying the appropriate output feed of the time gates, as shown in FIG. 1.

Some beams receive two hits and some receive four hits for every hit received in other beams. This variation in data rates among the beams compensates for their corresponding deficiencies in associated two-way antenna gain.

In addition to having the same features as those possessed by the high range resolution tracker radar, this sequential lobing radar tracker can also provide nine beams from a four-horn configuration that will enable one to more easily observe the radar characteristics of a given target without significant interference due to the presence of other targets.

It is intended that all matter contained in the above description as shown in the accompanying drawings shall be interpreted as illustrative and not in a limiting sense; for example, in automatic tracking radars which must simultaneously track two or more targets within its composite beam. When tracking two or more targets within a composite beam, only one target can be angle tracked in a closed loop while the remaining targets must be angle tracked in open loops. Therefore, the open loop angular accuracies are at the mercy of receiver instabilities in conventional monopulse trackers. Since only one receiver is employed in a sequential lobing radar tracker, the effects of receiver instability are eliminated and open loop angular accuracy should be significantly better than that of a monopulse system.

This type of radar could be applied in a missile range instrumentation system where accurate miss distance between an interceptor missile and its target is required. Even though the minimum miss distance could easily be less than the range resolution of a radar, accurate interpolation or extrapolation can be used on measurements which were made while the interceptor and its target are in separate resolution elements.

Also, in automatic landing radar systems using fixed antennas and calibrated error patterns, use of the instant sequential lobing radar system eliminates multi-receiver channel instability as a source of angular error, and enables a more precise calibration of antenna error patterns. Similarly, in mechanical scan radars which track multiple targets with high order beam splitting techniques that require a calibrated error pattern, us of the instant sequential lobing radar technique permits more accurate open loop measurements in angle because of the single receiver. And use of my sequential lobing radar technique in a long range tracking radar allows one to conveniently parallel four transmitter units in order to achieve greater range. First, the sequential lobing radar does not require a hybrid assembly in the transmitter while the monopulse radar does. Second, each channel of the four channel rotary joint in the sequential lobing radar must handle only one-fourth the total power of that used in the high power channel of the three channel rotary joint in the monopulse system. Third, all duplexers in the sequential lobing radar can be designed to handle only one-fourth the total power of the single high power duplexer used in monopulse.

This method of paralleling transmitter units not only allows one to achieve greater range in a sequential lobing radar but also allows one to perform the required phase switching at a very low power level. The phase network in the transmitter sub-system produces the required phase relationships for the signal inputs to the transmitter units. Table I contains these relationships for each sequence interval.

What is claimed is:

1. The method of tracking a target using a sequential lobing radar system having a four-horn feed array and R-F hybrid assembly means comprising the steps of: sequentially phase switching the outputs of each of four transmitters, simultaneously passing the phase-switched power from each of the transmitters to each of four inputs to said R-F hybrid assembly means, combining said phase-switched power in said hybrid assembly to form a single beam, radiating said beam in a repeated sequence from each of said horns in said array, only one of said horns radiating during each sequence interval, receiving reflected energy in all of said horns from a target near the antenna axis during each sequence interval, and comparing the amplitudes of signals received in said horns to provide error signals for maintaining the antenna on target.

2. The method of target tracking in an automatic tracking sequential lobing radar system, said system having a four-horn feed array and four receivers but with only one of said receivers in a closed angle tracking loop comprising the steps of transmitting a repeated sequence of four beams from said four-horn feed array, and separating the received signals by time gates according to predetermined sequence intervals to produce nine beams from said four-horn array to more easily observe the radar characteristics of given target without significant inteference due to other targets.

3. A sequential lobing radar system comprising a transmitter, antenna means comprising a four-horn feed array, a closed angle tracking loop having only one receiver in said loop, R-F hybrid assembly means having a transmit-mode of operation and a receive-mode of operation, said R-F hybrid assembly means operating in said transmit-mode to pass total feed power from said transmitter to each of said horns in said four-horn feed array in a predetermined manner, phase switching means in said transmitter for repetitiously controlling the relative phase of four outputs from said transmitter such that total transmitter power is passed, by said hybrid assembly means operating in said transmit-mode, in a sequential manner to provide a sequential output at each of said horns in said four-horn array, said R-F hybrid assembly means operating in said receive-mode to produce a sequence of sum signals from the signals received by said feed array, and receiver means for converting said sequence of signals to azimuth and elevation error signals which maintain the axis of said antenna on target.

4. In a directive radio system having a transmitter, a four-horn feed array, and a closed angle tracking loop having only one receiver in said loop, apparatus for producing nine beams from said feed array comprising R-F hybrid assembly means having a transmit-mode of operation and a receive-mode of operation, and phase switching means coacting with said R-F hybrid assembly means in the transmit-mode for controlling the phase relationship of each of four inputs to said R-F hybrid assembly means, means for producing one sequence of sum signals and three sequences of difference signals from signals received by the horns in said feed array, said last-mentioned means coacting with said hybrid assembly means in the receive-mode, and angle resolution matrix means including time gate means for producing nine beams from said sequences of sum and difference signals from all the energies received from an individual target from all of said horns for tracking said target without significant interference due to the presence of other targets.

References Cited by the Examiner

UNITED STATES PATENTS 2,929,058 3/1960 Blasberg et al. -------- 343—16

CHESTER L. JUSTUS, *Primary Examiner.*

T. H. TUBBESING, *Assistant Examiner.*